United States Patent
Lee et al.

(10) Patent No.: US 8,760,448 B2
(45) Date of Patent: Jun. 24, 2014

(54) MOBILE TERMINAL HAVING A TOUCHSCREEN FOR DISPLAYING A 3-DIMENSIONAL (3D) USER INTERFACE AND CONTROLLING METHOD THEREOF

(75) Inventors: Shinhae Lee, Seoul (KR); Hayang Jung, Seoul (KR); Seunghyun Woo, Seoul (KR)

(73) Assignee: LG Electronics Inc., Seoul (KR)

( * ) Notice: Subject to any disclaimer, the term of this patent is extended or adjusted under 35 U.S.C. 154(b) by 239 days.

(21) Appl. No.: 13/118,012

(22) Filed: May 27, 2011

(65) Prior Publication Data

US 2012/0081359 A1  Apr. 5, 2012

(30) Foreign Application Priority Data

Oct. 4, 2010 (KR) ........................ 10-2010-0096263

(51) Int. Cl.
*G06T 19/00* (2011.01)
(52) U.S. Cl.
USPC ....................................................... 345/419
(58) Field of Classification Search
USPC ....................................................... 345/419
See application file for complete search history.

(56) References Cited

U.S. PATENT DOCUMENTS

| | | | | |
|---|---|---|---|---|
| 6,411,312 B1 * | 6/2002 | Sheppard | ...................... | 715/769 |
| 6,486,895 B1 * | 11/2002 | Robertson et al. | ............ | 715/776 |
| 2008/0055305 A1 * | 3/2008 | Blank et al. | ................... | 345/419 |
| 2008/0246778 A1 * | 10/2008 | Ham et al. | ..................... | 345/646 |
| 2009/0058828 A1 * | 3/2009 | Jiang et al. | ..................... | 345/173 |
| 2009/0237367 A1 * | 9/2009 | Ryu et al. | ....................... | 345/173 |
| 2010/0060475 A1 * | 3/2010 | Choi | ............................. | 340/689 |
| 2010/0125816 A1 * | 5/2010 | Bezos | ........................... | 715/863 |
| 2010/0253766 A1 * | 10/2010 | Mann et al. | .................... | 348/51 |
| 2011/0157155 A1 * | 6/2011 | Turner et al. | .................. | 345/419 |

FOREIGN PATENT DOCUMENTS

| | | |
|---|---|---|
| CN | 101500328 | 8/2009 |
| CN | 101673179 | 3/2010 |

* cited by examiner

*Primary Examiner* — James A Thompson
*Assistant Examiner* — Sarah Le
(74) *Attorney, Agent, or Firm* — Lee, Hong, Degerman, Kang & Waimey

(57) ABSTRACT

A mobile terminal and controlling method thereof are provided. A method of controlling a mobile station according to one embodiment of the present invention comprises displaying a 3D user interface including at least one portion of a stereoscopic structure on a touchscreen, in which a plurality of layers including at least one icon are arranged centering on a central axis by being spaced apart from each other with a prescribed gap in-between, detecting a touch input of a first pattern via the touchscreen, and giving different 3D depths to at least one or more layers included in the 3D user interface among a plurality of the layers, respectively, and changing a position of each of a plurality of the layers according to a touch input of a second pattern in a manner of rotating centered on the central axis.

14 Claims, 21 Drawing Sheets

(a)

(b)

MOBILE TERMINAL HAVING A TOUCHSCREEN FOR DISPLAYING A 3-DIMENSIONAL (3D) USER INTERFACE AND CONTROLLING METHOD THEREOF

Pursuant to 35 U.S.C. §119(a), this application claims the benefit of earlier filing date and right of priority to Korean Patent Application No. 10-2010-0096263, filed on Oct. 4, 2010, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for providing a stereoscopic user interface.

2. Discussion of the Related Art

Generally, terminals can be classified into mobile/portable terminals and stationary terminals according to possibility of mobility. In another aspect, the mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural parts and/or software parts of the terminal.

Recently, as a 3-dimentional (hereinafter abbreviated 3D) image can be implemented on a display unit of a terminal, the demand for a more convenient manipulating method via a 3D user interface is going to increase.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a more convenient 3D user interface can be provided.

Another object of the present invention is to provide a mobile terminal and controlling method thereof, by which a 3D user interface can be provided through a plurality of layers situated in a 3D space.

A further object of the present invention is to provide a mobile terminal and controlling method thereof, by which a 3D user interface can be selectively displayed as a 3D stereoscopic image through a convenient manipulation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a controller and a touchscreen configured to display a 3D user interface including at least one portion of a stereoscopic structure, in which a plurality of layers including at least one icon are arranged centering on a central axis by being spaced apart from each other with a prescribed gap in-between. In this case, if there is a touch input of a first pattern via the touchscreen, the controller gives different 3D depths to at least one or more layers included in the 3D user interface among a plurality of the layers, respectively, provides a user with the 3D user interface having the 3D depth given thereto as a 3D stereoscopic image, and controls a position of each of a plurality of the layers to be changed according to a touch input of a second pattern in a manner of rotating centered on the central axis.

In another aspect of the present invention, a method of controlling a mobile terminal includes the steps of displaying a 3D user interface including at least one portion of a stereoscopic structure on a touchscreen, in which a plurality of layers including at least one icon are arranged centering on a central axis by being spaced apart from each other with a prescribed gap in-between, detecting a touch input of a first pattern via the touchscreen, giving different 3D depths to at least one or more layers included in the 3D user interface among a plurality of the layers, respectively, providing a user with the 3D user interface having the 3D depth given thereto as a 3D stereoscopic image, and changing a position of each of a plurality of the layers according to a touch input of a second pattern in a manner of rotating centered on the central axis.

Accordingly, the present invention provides the following effects and/or advantages.

First of all, a mobile terminal according to at least one embodiment of the present invention can be more conveniently manipulated through a stereoscopic user interface.

Secondly, the present invention provides a 3D user interface using a 3D layer structure situated in a 3D space, thereby facilitating a user to manipulate a mobile terminal with a new visual effect.

Thirdly, the present invention is able to conveniently determine whether to display a 3D user interface as a 3D stereoscopic image through a touchscreen manipulation.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
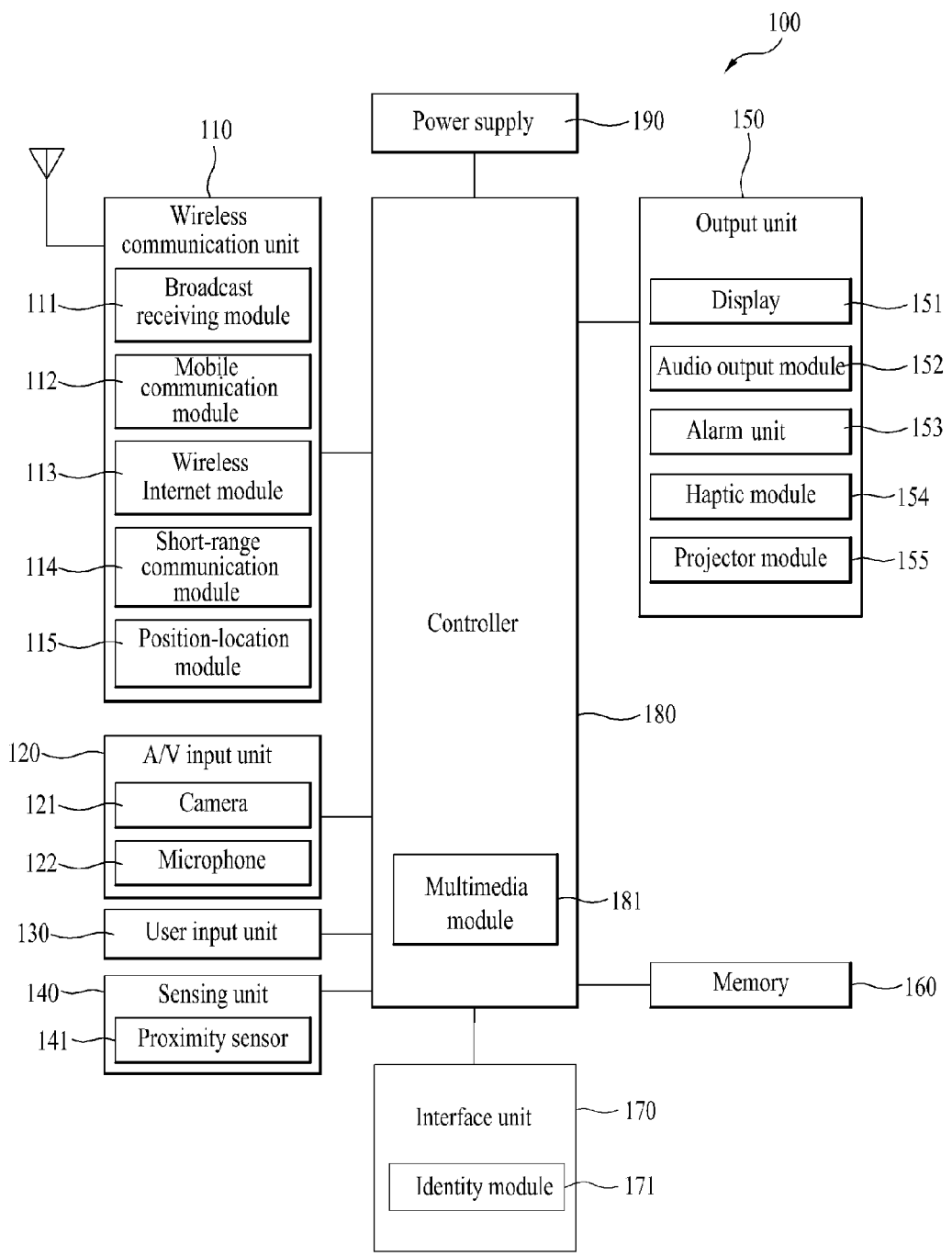
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless Internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module 171, audio input/output ports, video input/output ports, an earphone port and/or the like.

The identity module 171 is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
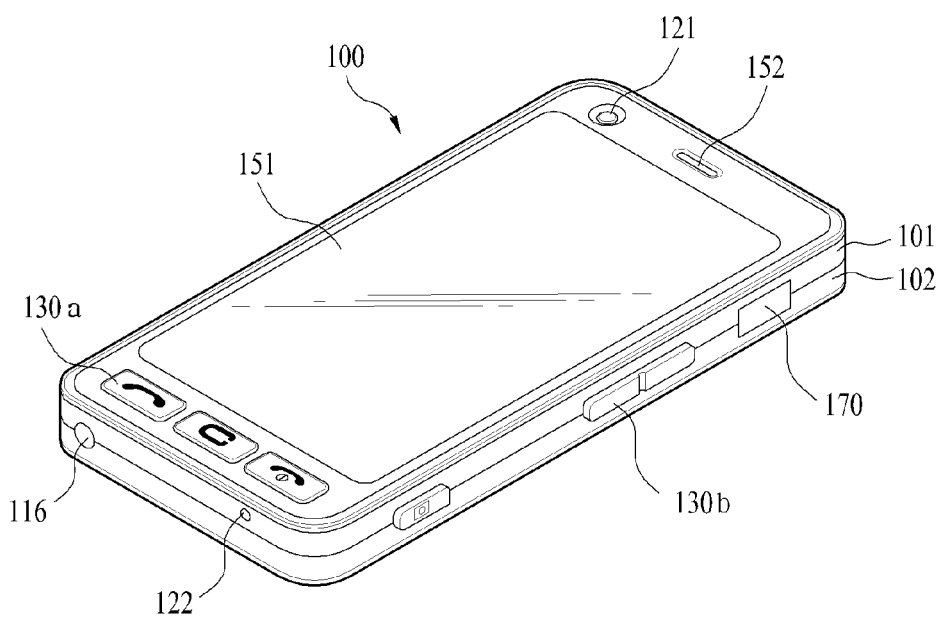
FIG. 2 is a front perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input unit 130, a microphone 122, an interface unit 170 and the like can be provided to the terminal body, and more particularly, to the front case 101.

The input unit is manipulated to receive a command for controlling an operation of the terminal 100. And, the input unit is able to include a plurality of manipulating units 130a and 130b. The manipulating units 130a and 130b can be named a manipulating portion and may adopt any mechanism of a tactile manner that enables a user to perform a manipulation action by experiencing a tactile feeling.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

Content inputted by the first or second manipulating unit 130a or 130b can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 130b.

Interconnected operational mechanism between the display 151 and the touchpad 135 are explained with reference to FIG. 3 as follows.

Figure 3:
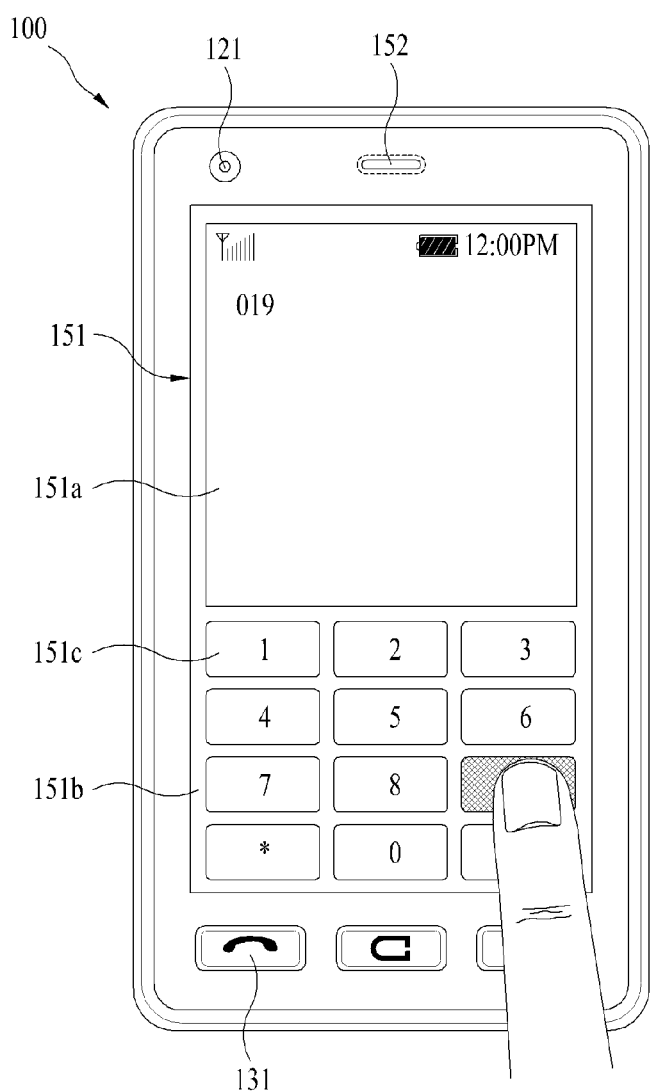
FIG. 3 is a front diagram of a mobile terminal according to one embodiment of the present invention to describe one operative status thereof.

FIG. 3 is a front-view diagram of a terminal according to one embodiment of the present invention for explaining an operational state thereof.

First of all, various kinds of visual information can be displayed on the display 151. And, this information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3 shows that a touch applied to a soft key is input through a front face of a terminal body.

The display 151 is operable through an entire area or by being divided into a plurality of regions. In the latter case, a plurality of the regions can be configured interoperable.

For instance, an output window 151a and an input window 151b are displayed on the display 151. A soft key 150c representing a digit for inputting a phone number or the like is outputted to the input window 151b. If the soft key 150c is touched, a digit corresponding to the touched soft key is output to the output window 151a. If the first manipulating unit 130a is manipulated, a call connection for the phone number displayed on the output window 151a is attempted.

Besides, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

To cope with a case that both of the display (touch screen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display 151 or the touchpad 135.

For clarity and convenience of the following description, a mobile terminal 100 mentioned in the following description is assumed as including at least one of the components shown in FIG. 1. Meanwhile, such a graphic for pointing at a specific object on a display or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

In the following description, a method of displaying a 3D image in a mobile terminal applicable to embodiments of the present invention and a display unit configuration for the same are explained.

First of all, 3D images implemented on the display 151 of the mobile terminal 100 according to can be mainly classified into two kinds of categories. In this case, the reference for this classification is attributed to whether different images are provided to both eyes, respectively.

The first 3D image category is described as follows.

First of all, the first category is a monoscopic scheme of providing the same image to both eyes and is advantageous in that it can be implemented with a general display unit 151. In particular, the controller 180 arranges a polyhedron generated from combining at least one of dots, lines, surfaces or combination thereof in a virtual 3D space and enables an image, which is generated from seeing the polyhedron in a specific view, to be displayed on the display unit 151. Therefore, such a stereoscopic image can substantially include a planar image.

Secondly, the second category is a stereoscopic scheme of providing different image to both eyes, respectively, which uses the principle that a user can sense a stereoscopic effect in looking at an object with human eyes. In particular, human eyes are configured to see different planar images in looking at the same object due to a distance between both eyes. These different images are forwarded to a human brain via retinas. The human brain is able to sense depth and reality of a 3D image by combining the different images together. Therefore, the binocular disparity attributed to the distance between both of the eyes enables the user to sense the stereoscopic effect despite that there is an individual difference of the binocular disparity more or less. Therefore, the binocular disparity becomes the most important factor of the second category. The binocular disparity is explained in detail with reference to FIG. 4 as follows.

Figure 4:
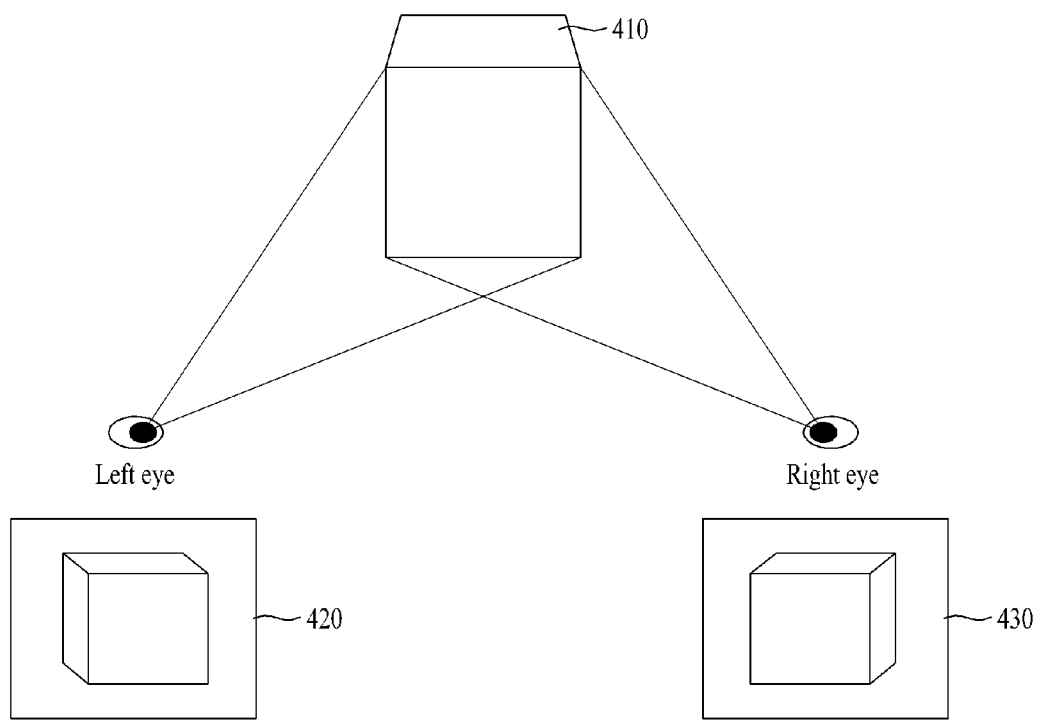
FIG. 4 is a diagram for describing the principle of binocular disparity.

FIG. 4 is a diagram for explaining the principle of binocular disparity.

Referring to FIG. 4, assume a situation that a hexahedron 410 is positioned as a subject in front below an eye's height to be seen through human eyes. In this case, a left eye is able to see a left eye planar image 420 revealing three facets including a top side, a front side and a left lateral side of the hexahedron 410 only. And, a right eye is able to see a right eye planar image 430 revealing three facets including the top side, the front side and a right lateral side of the hexahedron 410 only.

Even if a real thing is not actually positioned in front of both eyes of a user, if the left eye planar image 420 and the right eye planar image 430 are set to arrive at the left eye and the right eye, respectively, a user is able to substantially sense the hexahedron 410 as if looking at the hexahedron 31 actually.

Thus, in order to implement the 3D image belonging to the second category in the mobile terminal 100, images of the same object should arrive at both eyes in a manner of being discriminated from each other for the left and right eye images of the same object with a predetermined parallax.

In order to discriminate the above-mentioned two categories from each other in this disclosure, a stereoscopic image belonging to the first category shall be named 'monoscopic 3D image' and a stereoscopic image belonging to the second category shall be named '3D stereoscopic image'.

A method of implementing a 3D stereoscopic image is described as follows.

First of all, as mentioned in the following description, in order to implement a 3D stereoscopic image, an image for a right eye and an image for a left eye need to arrive at both eyes in a manner of being discriminated from each other. For this, various methods are explained as follows.

1) Parallax Barrier Scheme

The parallax barrier scheme enables different images arrive at both eyes in a manner of controlling a propagating direction of light by electronically driving a cutoff device provided between a general display and both eyes. This is explained with reference to FIG. 5 as follows.

Figure 5:
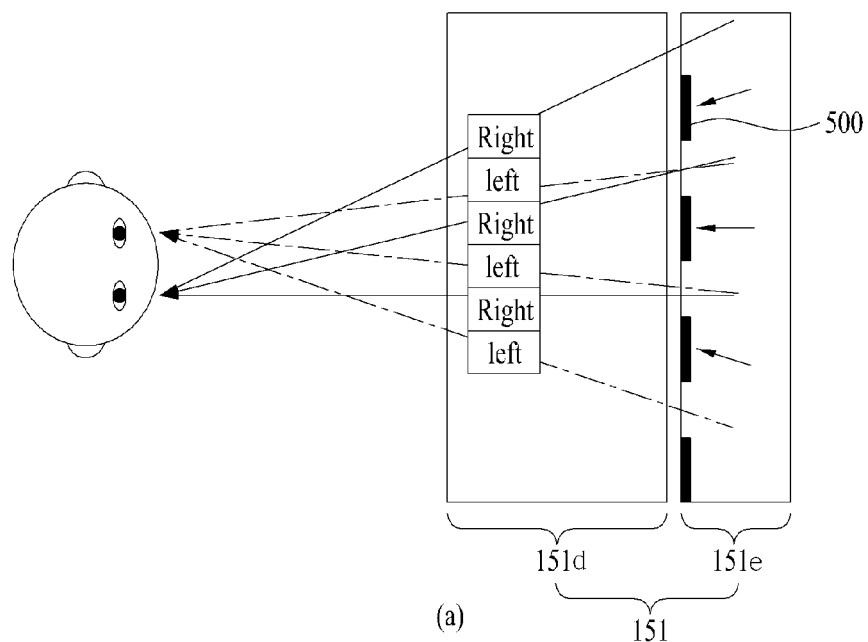
FIG. 5 is a conceptional diagram for a scheme of implementing a 3D stereoscopic image in a display unit of a parallax barrier type applicable to embodiments of the present invention.
Figure 5:
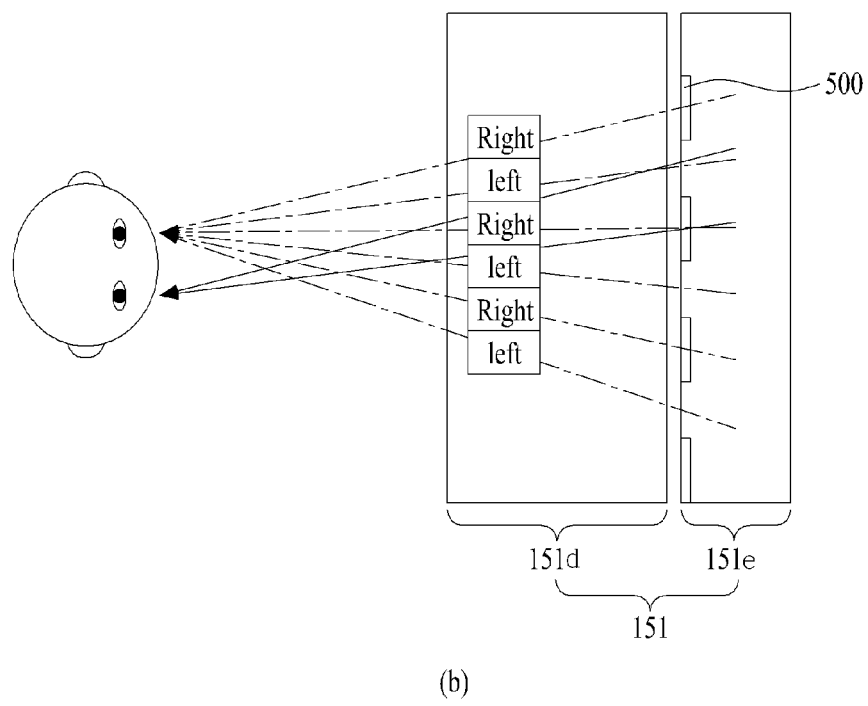

FIG. 5 is a conceptional diagram for a scheme of implementing a 3D stereoscopic image in a display unit of a parallax barrier type applicable to embodiments of the present invention.

Referring to FIG. 5, a structure of a parallax barrier type display 151 for displaying a 3D image can be configured in a manner that a general display device 151d is combined with a switch LC (liquid crystals) 151e. A propagating direction of light is controlled by activating an optical parallax barrier 500, as shown in FIG. 5 (a), using the switch LC 151e, whereby the light is separated into two different lights to arrive at left and right eyes, respectively. Thus, when an image generated from combining an image for the right eye and an image for the left eye together is displayed on the display device 151d, a user sees the images corresponding to the eyes, respectively, thereby feeling the 3D or stereoscopic effect.

Alternatively, referring to FIG. 5 (b), the parallax barrier 500 attributed to the switch LC 151e is electrically controlled to enable entire light to be transmitted therethrough, whereby the light separation due to the parallax barrier is avoided. Therefore, the same image can be seen through left and right eyes. In this case, the same function of a conventional display unit is available.

In particular, FIG. 5 exemplarily shows that the parallax barrier performs parallel translation in one axial direction, by which the present invention is non-limited. Alternatively, the present invention is able to use a parallax barrier that enables parallel translation in at least two axial directions according to a control signal from the controller 180.

2) Lenticular

The lenticular scheme relates to a method of using a lenticular screen provided between a display and both eyes. In particular, a propagating direction of light is refracted via lens on the lenticular screen, whereby different images arrive at both eyes, respectively.

3) Polarized Glasses

According to the polarized glasses scheme, polarizing directions are set orthogonal to each other to provide different images to both eyes, respectively. In case of circular polarization, polarization is performed to have different rotational direction, whereby different images can be provided to both eyes, respectively.

4) Active Shutter

This scheme is a sort of the glasses scheme. In particular, a right eye image and a left eye image are alternately displayed on a display unit with prescribed periodicity. And, user's glasses close its shutter in an opposite direction when an image of a corresponding direction is displayed. Therefore, the image of the corresponding direction can arrive at the eyeball in the corresponding direction. Namely, while the left eye image is being displayed, a shutter of the right eye is closed to enable the left eye image to arrive at the left eye only. On the contrary, while the right eye image is being displayed, a shutter of the left eye is closed to enable the right eye image to arrive at the right eye only.

For clarity and convenience of the following description, assume that a mobile terminal mentioned 100 in the following description includes at least one of the components shown in FIG. 1. In particular, assume that a mobile terminal, to which the present invention is applicable, includes a touchscreen configured to provide a 3D stereoscopic image to a user by at least one of the above mentioned 3D stereoscopic image implementing schemes.

The object of the present invention is to provide a user with a more convenient stereoscopic user interface, and more particularly, an interface using a plurality of layers.

In this case, each of the layers is a plane having a predetermined size. And, a shape and size of the corresponding layer can be implemented in various ways. For instance, each of the layers can be implemented in such a shape as a rectangle, a circle, a rhombus and the like. And, a size of the corresponding layer can be set in a manner of being implemented on a partial or whole region of the display unit to correspond to an overall size of the display unit.

In the following description, assume that each of a plurality of the layers includes at least one icon.

The present invention assumes that a plurality of layers are sequentially arranged with reference to a central axis. A structure of a plurality of the arranged layers is described with reference to FIG. 6 as follows.

Figure 6:
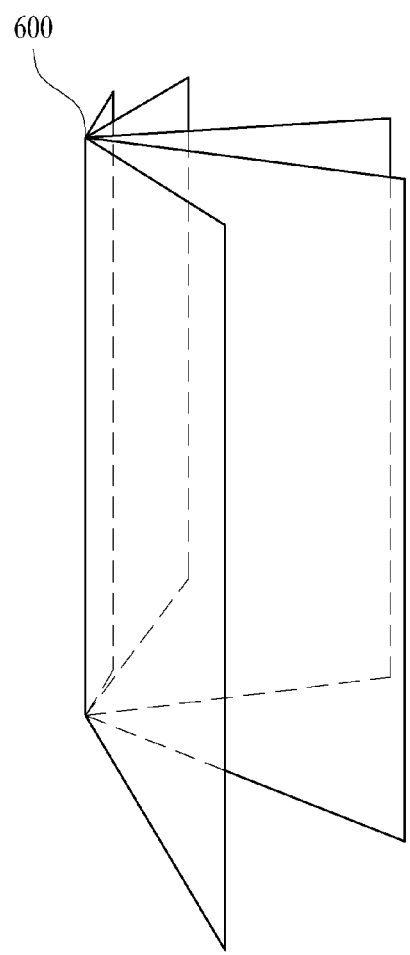
FIG. 6 is a diagram for one example of a stereoscopic layer structure according to the present invention, in which a plurality of layers are arranged in a manner of being spaced apart from each other with a prescribed space in-between centering on a central axis.

FIG. 6 is a diagram for one example of a stereoscopic layer structure according to the present invention, in which a plurality of layers are arranged in a manner of being spaced apart from each other with a prescribed space in-between centered on a central axis.

Referring to FIG. 6, the controller 180 is able to generate a stereoscopic layer structure, of which position can be changed according to a user's touch input, by arranging a plurality of layers in a manner that the layers are spaced apart from each other with a prescribed gap in-between with reference to a central axis 600.

In particular, a position of each of the layers can be changed by a user's flicking or scroll action. For example of a type for changing the layer position, at least one layer can be rotated centered on the central axis, by which the present invention is non-limited. Alternatively, each layer can be variously rotated or moved in parallel irrespective of the central axis for example.

Meanwhile, a mobile terminal according to the present invention can be variously implemented according to a method of manipulating a plurality of layers, of which detailed embodiments are described as follows.

First Embodiment

A mobile terminal according to one embodiment of the present invention provides a 3D stereoscopic image only if a touch input of a specific pattern is made according to a user's selection. Otherwise, the mobile terminal can be configured to provide a 2D stereoscopic image.

Recently, the use of the 3D stereoscopic image is expanding. Yet, if a change in the manner of selecting whether to use the 3D stereoscopic image is provided to a user accustomed to the conventional 2D stereoscopic image, a more convenient user interface is provided to the user.

According to one embodiment of the present invention, only if a touch input of a specific pattern is performed by a user, each of a plurality of layers is displayed as a 3D stereoscopic image on a touchscreen.

In particular, in order to discriminate a general touch input for a screen scroll, a menu selection, an information reading and the like from a user's touch input for displaying a plurality of layers as a 3D stereoscopic image, a plurality of the layers in the 3D stereoscopic image is displayed only if there is a touch input of a specific pattern.

In the following description, for clarity, a touch input for conversion to a 3D stereoscopic image shall be named a touch input of a first pattern.

For example, the touch input of the first pattern is performed in a manner that a user touches a specific region of a touchscreen of a mobile terminal. For another example, the touch input of the first pattern can include a touch input performed in a manner that a user holds a touch area exceeding a predetermined region of a touchscreen in his palm.

For further example, the touch input of the first pattern can include a long touch, a proximity touch, a long proximity touch or a multi-touch, which is performed on a region free from such an object as an icon and the like within each layer.

Once the touch input of the first pattern is detected, layers of a previous 2D stereoscopic image are displayed as a 3D stereoscopic image on the touchscreen. In particular, a prescribed 3D depth is given to each of the layers. In doing so, icons included in each of a plurality of the 3D layers can be implemented into 3D stereoscopic images, respectively.

In the following description, assuming that a touch input of a first pattern is performed by a user, a method of displaying a plurality of layers 3-dimensionally is explained in detail with reference to FIGS. 7 to 9.

Figure 7A:
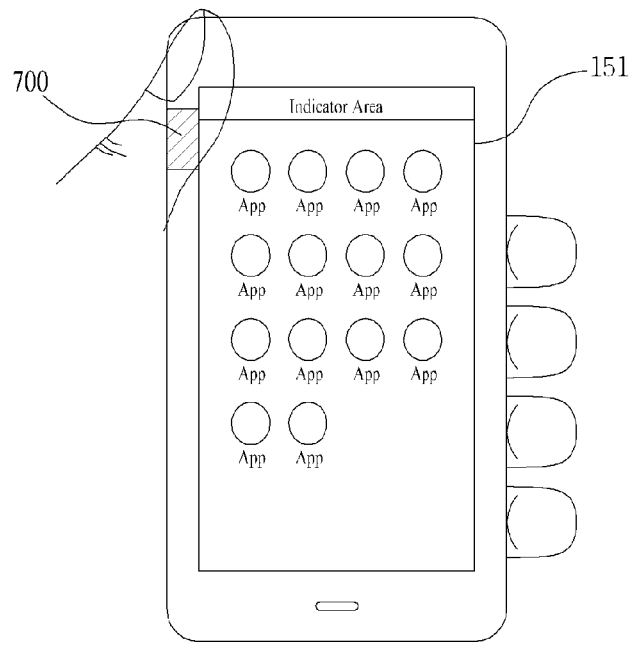
FIGS. 7A-D are diagrams of display configurations of a 3D user interface implemented if a user performs a touch input of a first pattern according to one embodiment of the present invention.
Figure 7B:
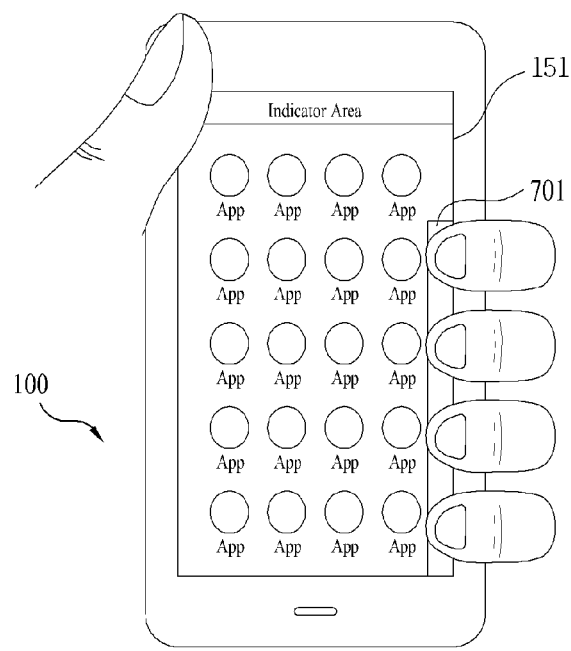

FIGS. 7A and 7B are diagrams of display configurations of a 3D user interface implemented if a user performs a touch input of a first pattern according to one embodiment of the present invention.

Although the display configuration diagrams in the following description are represented as planar images due to the limited representation capability of the drawings, it is assumed that the corresponding diagrams represent stereoscopic images provided to a user by the above-described 3D stereoscopic image implementations.

Referring to FIG. 7A, a user touches a partial region 700 of a left top corner of a mobile terminal 100 with a thumb for example of a touch input of a first pattern.

As mentioned in the foregoing description, the touch input of the first pattern can be performed in various ways. For instance, the touch input of the first pattern can include a touch input performed in a manner that a touch area exceeding a predetermined region 701 of a touchscreen, as shown in FIG. 7B, with a palm.

If the user performs the touch input of the first pattern, the controller is able to control the display in a manner that different 3D depths are given to a plurality of layers, respectively.

Figure 7C:
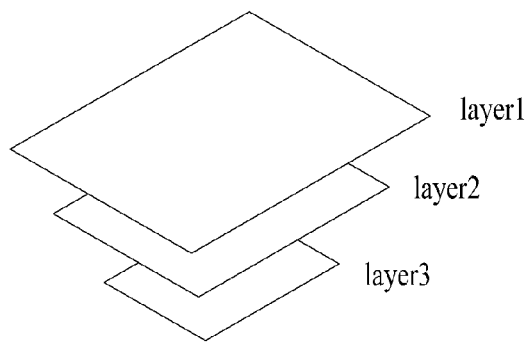

Referring to FIG. 7C, a total of 3 layers including a layer 1 to a layer 3 can be stacked in a stereoscopic space in a manner of being spaced apart from each other with a space in-between. In case that the layers are implemented as a 3D stereoscopic image through a touchscreen, the layer 1 is situated on a position closest to a user and has a shallow 3D depth to be sensed closer to the user. An arranged height tends to gradually decrease toward the layer 3 via the layer 2 to enable the user to sense that the corresponding layer with a deeper 3D depth is situated farther from the user.

Arranged positions and/or 3D depths of the above-configured layers can be changed by a prescribed command input via the user input unit. The command input for manipulating the layers can be performed using a contact or proximity touch through the touchscreen 151.

In particular, assume that a surface of a layer having a 3D depth corresponding to a position of the layer 1 is just displayed clearly in the arranged state of the layers shown in FIG. 7C. And, assume that surfaces of the layers (i.e., the layer 2 and the layer 3) situated to the 3D depth deeper than the position of the layer 1 are blocked by the layer (i.e., the layer 1) situated to the 3D depth shallower than the layers (i.e., the layer 2 and the layer 3).

Figure 7D:
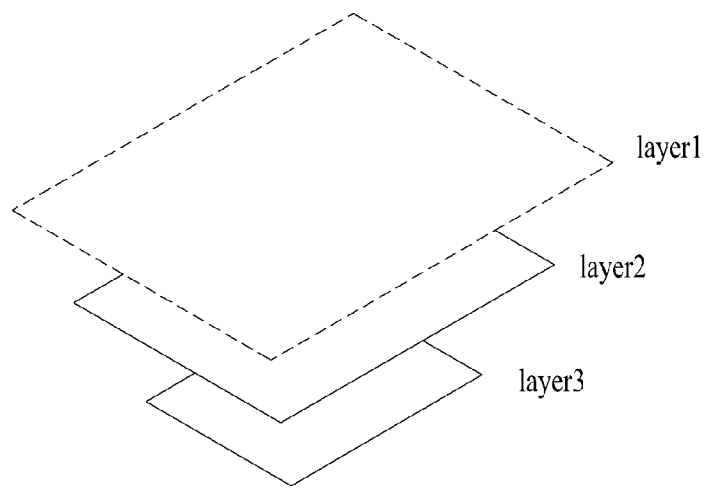

On the above assumptions, referring to FIG. 7D, a 3D depth can be lowered by a prescribed manipulation via the touchscreen to enable a user to sense that all layers are situated closer to user.

If so, the layer 2 has the 3D depth corresponding to the layer 1 in FIG. 7C. And, the layer 3 has the 3D depth corresponding to the layer 2 in FIG. 7C. In this case, like the assumptions, since the surface of the layer situated to the depth of the layer 1 shown in FIG. 7C is clearly displayed only, the surface of the layer 2 is displayed most clearly in FIG. 7D while the surface of the layer 3 is blocked by the surface of the layer 2.

Meanwhile, the layer 1 has the 3D depth shallower than its position in FIG. 7C. In this case, the controller 180 is able to make the layer 1 transparent or semitransparent if getting farther from the 3D depth of the layer 2.

Through the above-described operations of the mobile terminal 100, a user is able to clearly view the surface of the layer 2 without interruption. If the user deepens the 3D depths of all layers, it will result in the state shown in FIG. 7C again. If the 3D depths of all layers are further lowered, both of the layer 1 and the layer 2 become transparent or semitransparent to clearly display the surface of the layer 3.

In the following description, like the 3D depth of the layer 1 in FIG. 7C, the 3D depth, which enables a surface of a layer situated to the corresponding depth to be clearly displayed by avoiding being blocked by another clear layer, shall be named a reference depth.

An example of applying the operation of the 3D user interface described with reference to FIGS. 7A-D to the menu manipulation of the mobile terminal 100 is explained in detail with reference to FIG. 8 and FIGS. 9A and 9B as follows.

Figure 8:
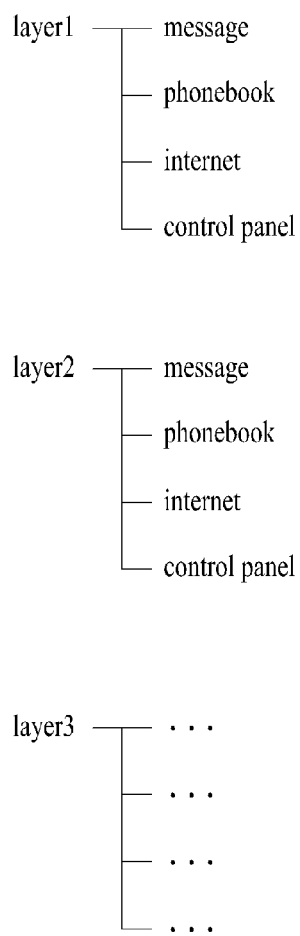
FIG. 8 is a diagram for one example of layers of a 3D user interface implemented if a user performed a touch input of a first pattern according to one embodiment of the present invention.

FIG. 8 is a diagram for one example of layers of a 3D user interface implemented if a user performed a touch input of a first pattern according to one embodiment of the present invention.

Referring to FIG. 8, menus in horizontal relation are mapped to a layer 1. And, the menus in horizontal relation are mapped to a layer 2 as well. In other words, the menus mapped to each of the layer 1 and the layer 2 are not in relation between a higher menu and a lower menu but can be independently selected.

A menu list selecting method through a layer manipulation in the mapping relation shown in FIG. 8 is explained with reference to FIG. 9 as follows.

Figure 9A:
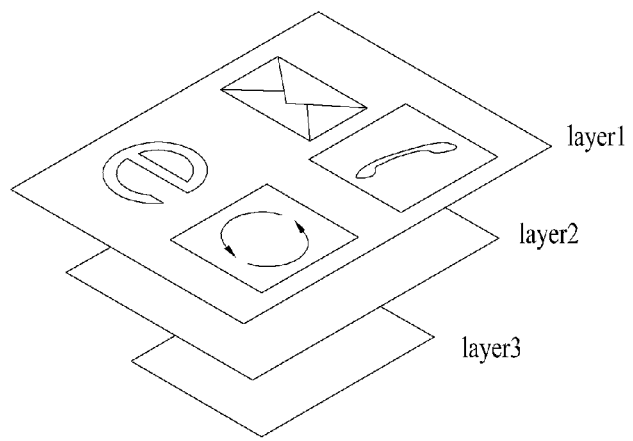
FIGS. 9A and 9B are conceptional display diagrams for one example of a menu selection via a 3D user interface implemented if a user performs a touch input of a first pattern according to one embodiment of the present invention.
Figure 9B:
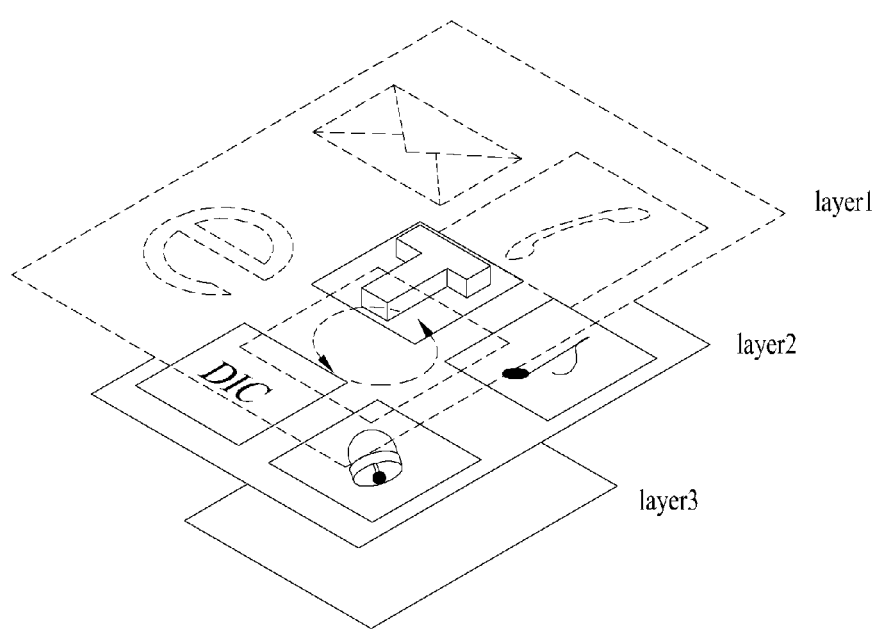

FIGS. 9A and 9B are conceptional display diagrams for one example of a menu selection via a 3D user interface implemented if a user performed a touch input of a first pattern according to one embodiment of the present invention.

The basic assumption in FIGS. 9A and 9B are similar to that in FIGS. 7A-D. For clarity, the redundant description shall be omitted from the following description. Yet, icons corresponding to the menus mapped to each layer, as shown in FIG. 8, are displayed on a surface of the corresponding layer.

Referring to FIG. 9A, as a layer 1 is situated to a reference depth, menu icons (i.e., message, phonebook, internet, control panel) mapped to the layer 1 are clearly displayed. Since a layer 2 and a layer 3 are blocked by the layer 1, their surfaces are not seen.

Subsequently, a user is able to arrange the layer 2 to the reference depth in a manner of lowering 3D depths of all layers through a prescribed manipulation (i.e., enabling the entire layers to look closer to the user).

Therefore, referring to FIG. 9B, as a depth the layer 1 becomes lower than the reference depth, the layer 1 becomes semitransparent. As the layer 2 is situated to the reference depth, the menu icons (i.e., game, music play, dictionary, alarm) mapped to the layer 2 can be displayed clearly. In this case, as the layer 3 is blocked by the layer 2, the surface of the layer 3 may still not be seen.

Meanwhile, a 3D stereoscopic structure is entirely displayed on a touchscreen. Alternatively, one layer can be displayed on a whole region of the touchscreen.

Figure 10A:
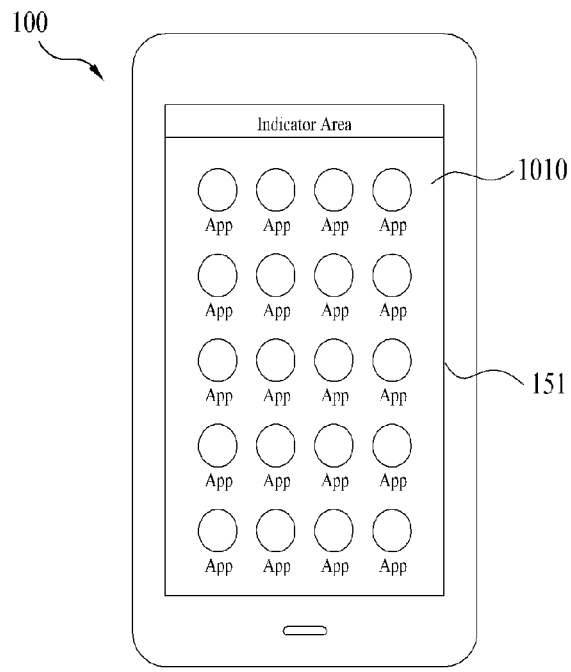
FIGS. 10A and 10B are diagrams for one example of displaying one of a plurality of layers on a whole touchscreen region according to one embodiment of the present invention.
Figure 10B:
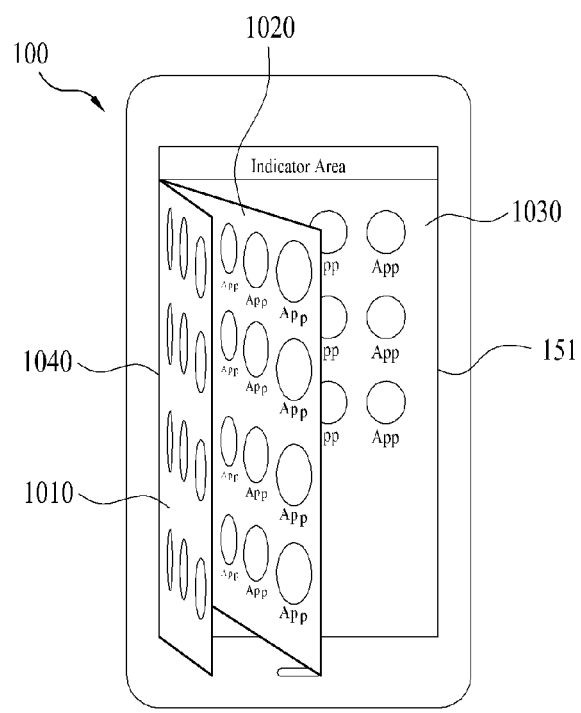

FIGS. 10A and 10B are diagrams for one example of displaying one of a plurality of layers on a whole touchscreen region according to one embodiment of the present invention.

In the following description, a layer, which is situated to the 'reference depth' to clearly appear without being blocked by another layer, shall be named a first layer.

Referring to FIG. 10A, a first layer 1010 is displayed on a whole touchscreen region.

If positions of a plurality of layers are changed by a first pattern touch input performed by a user in a manner of rotating the layers centered on a central axis, referring to FIG. 10B, other position-changeable layers 1020 and 1030 are 3-dimensionally displayed on the touchscreen by rotation centered on the central axis.

In this case, the non-transparent first layer is displayed on a whole touchscreen region. If 3D depths are not individually given to icons arranged on the first layer, respectively, a user may have difficulty in checking whether a plurality of layers are displayed as a 3D stereoscopic image via a touch input of a first pattern made by the user.

Therefore, in order to inform the user that the 3D stereoscopic image has been generated, a first visual effect can be displayed on the touchscreen.

In this case, the first visual effect plays a role as an indicator to enable the user to recognize that the layers are generated as a 3D stereoscopic image. Moreover, the first visual effect is able to provide the user with a function of changing a position of a 3D layer using a prescribed touch region. This shall be explained later with reference to FIGS. 15 to 17.

The first visual effect can be implemented through at least one of various effects including a color, a surface texture pattern, a flickering, a size variation, a shape change of at least one portion and the like. Yet, the first visual effect is non-limited by the above-mentioned effects and can be implemented through other effects.

The first visual effect keeps being displayed on the touchscreen only while the user performs the touch input of the first pattern. Alternatively, the first visual effect can be displayed on the touchscreen for predetermined duration after the touch input of the first pattern. Alternatively, the first visual effect can be turned on/off by toggling each time the touch of the first pattern is made. The above-described first visual effects are just exemplary. And, a duration of the first visual effect can be set in various ways. For instance, a user can randomly change the duration of the first visual effect through a setting menu. This is explained with reference to FIGS. 11A-C as follows.

Figure 11A:
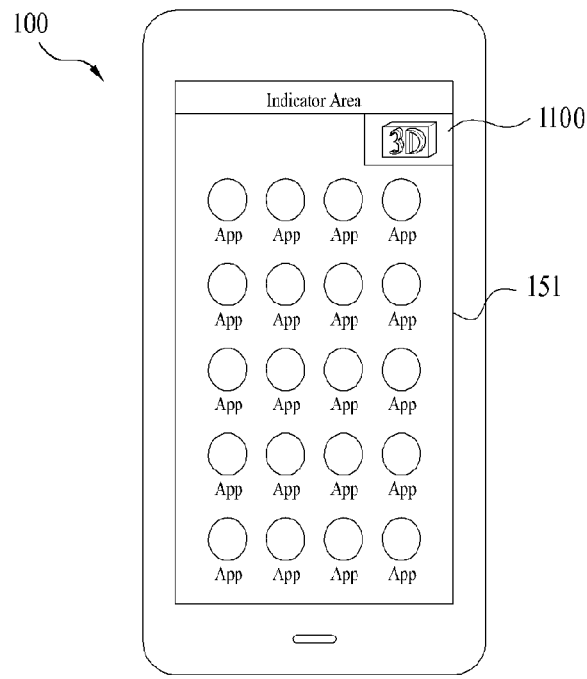
FIGS. 11A-C are diagrams of display configurations for one example of displaying a first visual effect on a touchscreen to indicate that a 3D stereoscopic image is generated in a mobile terminal according to one embodiment of the present invention.
Figure 11B:
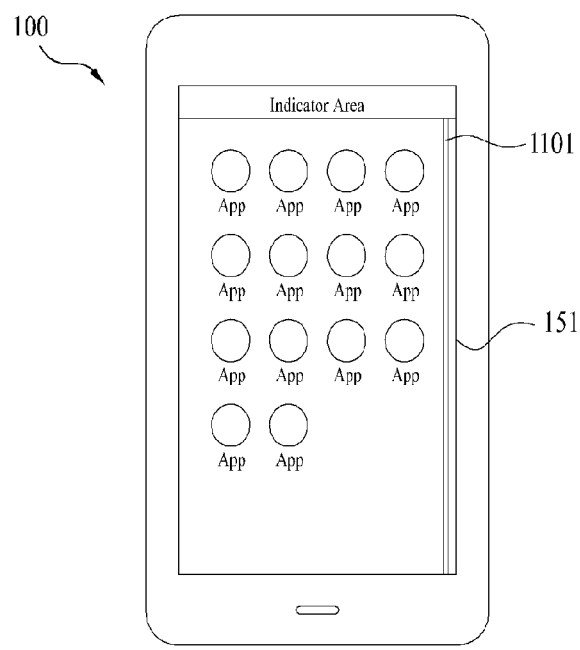
Figure 11C:
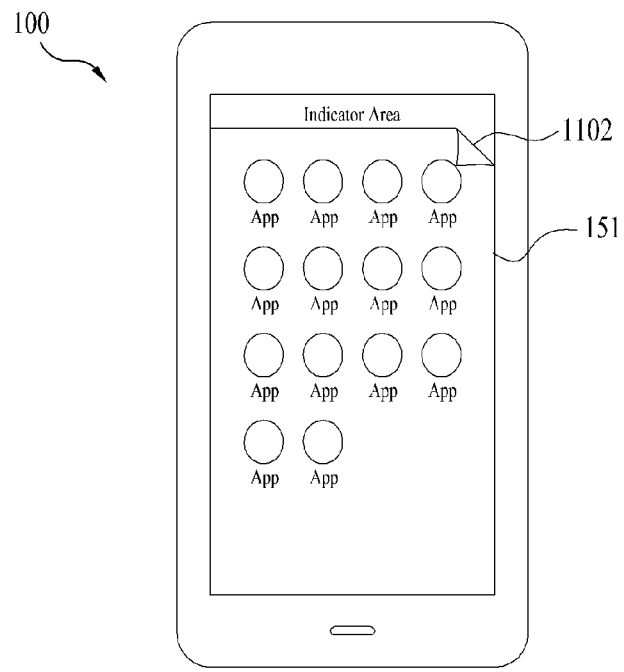

FIGS. 11A-C are diagrams of display configurations for one example of displaying a first visual effect on a touchscreen to indicate that a 3D stereoscopic image is generated in a mobile terminal according to one embodiment of the present invention.

Referring to FIG. 11A, if a touch input of a first pattern by a user is detected, a first visual effect 1100 of an icon type for indicating the generation of a 3D stereoscopic image is displayed as a 3D stereoscopic image on a right top side of a touchscreen.

For example of the first visual effect, referring to FIG. 11B, a prescribed 3D stereoscopic image effect can be given as a first visual effect 1101 in a manner that edges of other layers existing on a backside of the first layer are stacked on each other.

Referring to FIG. 11C, a second visual effect 1102 can be displayed on the touchscreen in a manner that one corner of the first layer is folded. As mentioned in the foregoing description, the first visual effect can provide a user with a function of changing a position of a 3D layer using a prescribed touch region.

Second Embodiment

A mobile terminal according to another embodiment of the present invention is able to provide a user interface. In particular, while an inclination is detected, a 3D stereoscopic image is rotated centered on a central axis at a prescribed speed to change positions of a plurality of layers. Thus, the user interface is able to display the position-changed layers on a touchscreen.

A user is able to respectively change positions of 3D layers by performing a prescribed touch command input via a pointer. In particular, the user is able to input a touch command (e.g., a drag, a flicking, etc.) for changing a region of a layer displayed on a touchscreen or the layer itself.

Figure 12A:
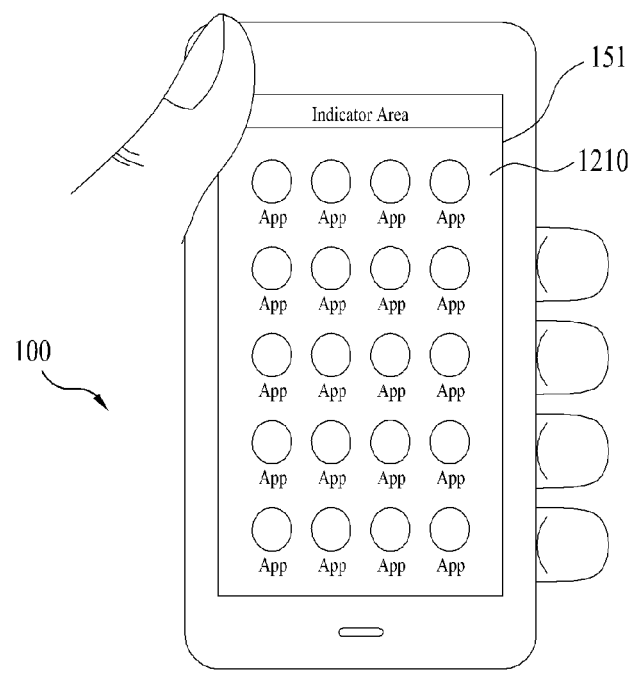
FIGS. 12A-C are diagrams for one example of a method of manipulating a 3D layer through an inclination of a 3D user interface implemented in a mobile terminal according to another embodiment of the present invention.
Figure 12B:
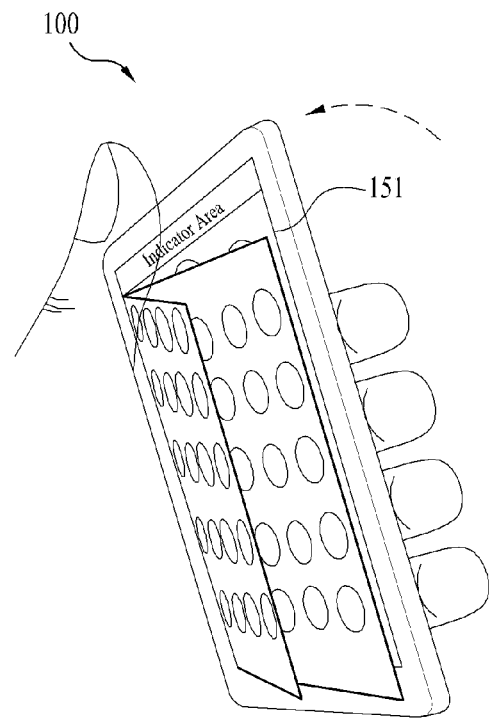
Figure 12C:
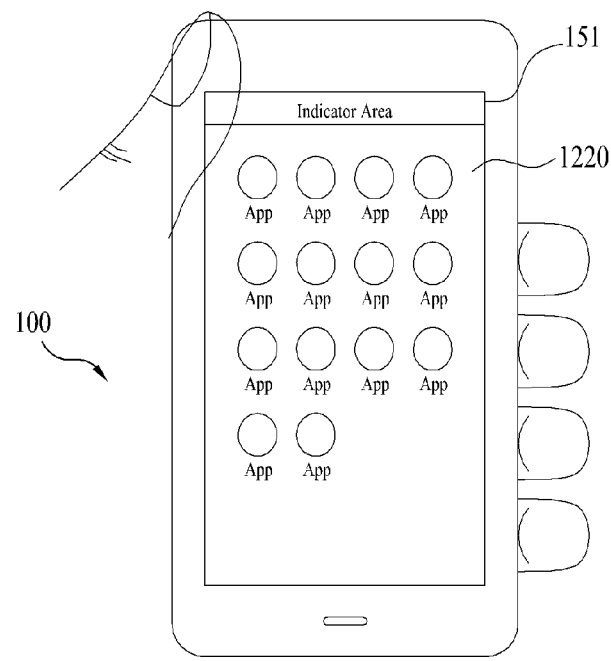

Yet, if the user is able to change the position without using the pointer in a manner of inclining the mobile terminal 100 at a prescribe dangle, a more convenient stereoscopic user interface is provided. This is explained with reference to FIGS. 12A-C as follows. FIGS. 12A-C are diagrams for one example of a method of manipulating a 3D layer through an inclination of a 3D user interface implemented in a mobile terminal 100 according to another embodiment of the present invention.

In the following description, as mentioned in the foregoing description with reference to FIG. 6, assume that the arranged formation of the 3D layer is a stereoscopic layer structure in which a plurality of layers are arranged in a prescribed configuration centering on a central axis.

Moreover, assume that there is a user's touch input of a first pattern to represent a plurality of layers as a 3D stereoscopic image.

And, a layer a user attempts to display on a touchscreen among a plurality of 3D layers shall be named a second layer.

In the following description, assume a case that a user attempts to display the second layer by changing positions of the 3D layers instead of the first layer currently displayed on the touchscreen.

Referring to FIG. 12A, a first layer 1210 among a plurality of 3D layers is displayed on a whole region of a touchscreen.

Referring to FIG. 12B, if a user inclines a mobile terminal 100, the sensing unit 140 detects the inclination and then informs the controller 180 of the detected inclination. The controller 180 controls a plurality of the 3D layers to be displayed on the touchscreen 151 in a following manner. First of all, while the inclination of the mobile terminal is detected through the sensing unit 140, the 3D stereoscopic image rotates at a prescribed speed centering on a central axis so that at least one of a position and a 3D depth of each of a plurality of the 3D layers can be changed. The position or 3D depth changed 3D layers are then displayed on the touchscreen 151. As a result, the user is provided with such a visual effect as turning pages.

In doing so, the controller 180 is able to control a degree of the rotation to correspond to the inclination (or slope) of the mobile terminal 100. In particular, if the degree of the inclination increases, the degree of the rotation can increase. If the degree of the inclination decreases, the degree of the rotation can decrease. If the speed of inclining the mobile terminal increases, the degree of the rotation can increase. If the speed of inclining the mobile terminal decreases, the degree of the rotation can decrease. If the mobile terminal 100 is inclined to the left, the direction of the rotation can become a left direction. If the mobile terminal is inclined to the right, the direction of the rotation can become a right direction.

In FIG. 12B, as the mobile terminal 100 is inclined to the left, the rotation is performed in the left direction. If a user inclines the mobile terminal 100 to the right, the 3D stereoscopic image will rotate in the right direction. This is just exemplary. Alternatively, the inclination and the rotation direction of the 3D stereoscopic image can be implemented in the opposite directions.

If the inclination of the mobile terminal keeps being detected via the sensing unit 140, each of a plurality of the layers is displayed on the touchscreen 151 by rotating at a predetermined speed centering on the central axis.

Subsequently, referring to FIG. 12C, if a specific second layer 1220 is displayed on the touchscreen, the user is able to situate the mobile terminal 100 in parallel. If so, the rotation stops and the second layer 1220 is displayed on the touchscreen 151.

Therefore, since the positions of the layers can be easily changed through the inclination, use of the mobile terminal 100 by the user is facilitated.

Meanwhile, it is able to rotate a 3D stereoscopic image by scrolling or flicking the touchscreen 151. In particular, if a user scrolls or flicks a predetermined region of the touchscreen 151, the 3D stereoscopic image is rotated to correspond to the scroll or flicking so that a layer arranged closest to the first layer can be displayed on the touchscreen.

A mobile terminal 100 according to the present invention is able to provide a user interface. According to the user interface, after at least one of a plurality of icons included in a first layer has been selected, if an inclination of the mobile terminal is detected, the user interface rotates a 3D stereoscopic image to change a position of the selected icon into a prescribed region of a second layer. This is explained with reference to FIGS. 13A-C as follows.

Figure 13A:
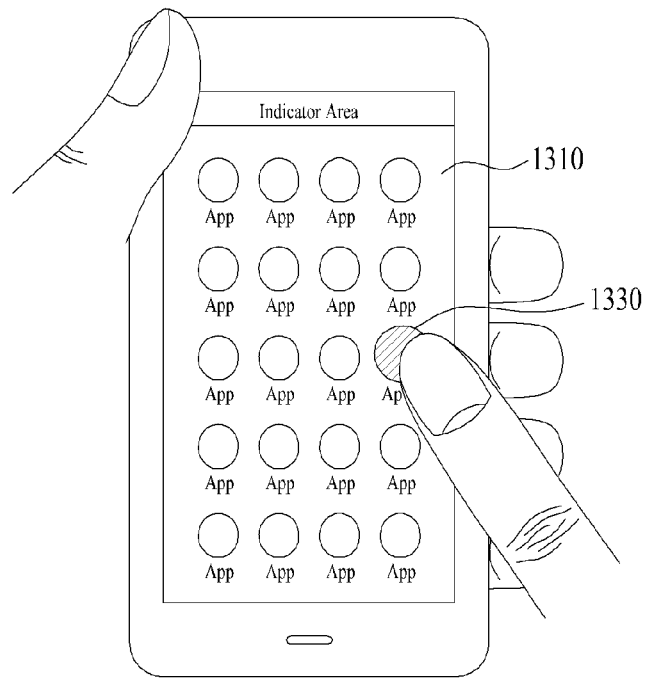
FIGS. 13A-C are diagrams for one example of a method of changing a position of an icon included in a 3D layer through an inclination in a mobile terminal according to another embodiment of the present invention.
Figure 13B:
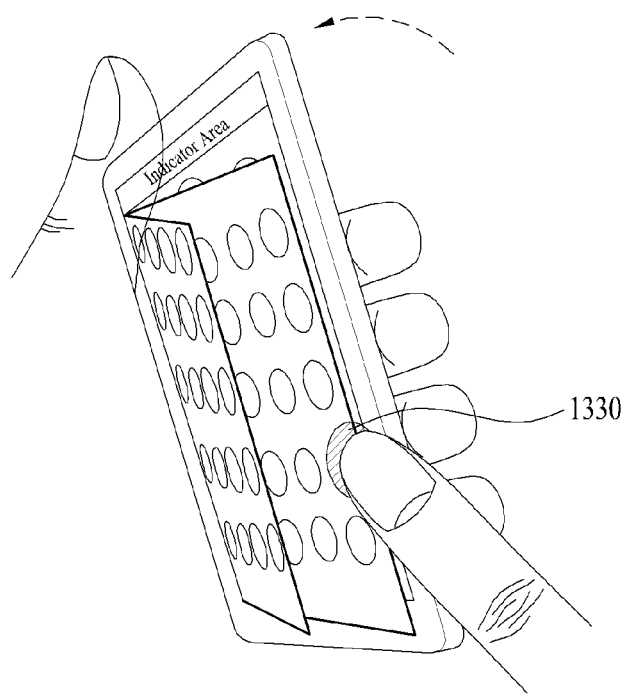
Figure 13C:
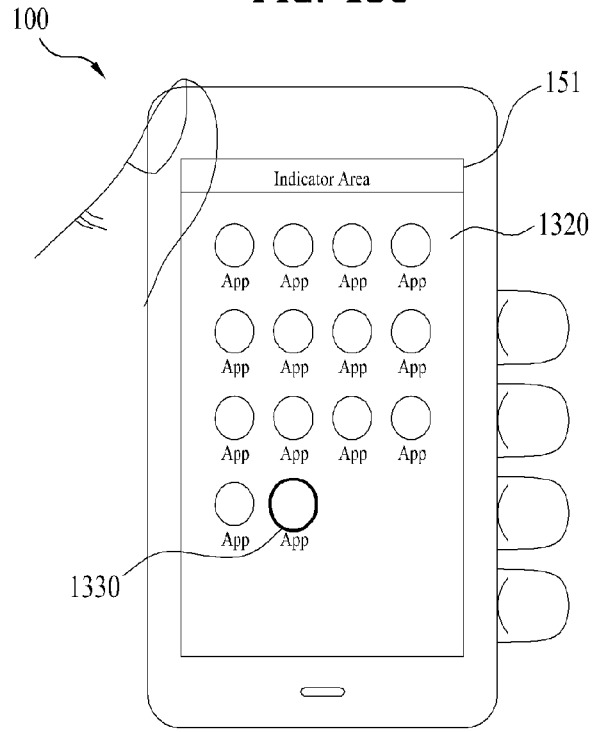

FIGS. 13A-C are diagrams for one example of a method of changing a position of an icon included in a 3D layer through an inclination in a mobile terminal 100 according to another embodiment of the present invention.

In the following description, assume that a user performs a touch input of a first pattern.

And, assume that the user attempts to shift a specific icon included in a first layer currently displayed on a touchscreen to a second layer by changing positions of 3D layers.

Referring to FIG. 13A, a first layer 1310 in a 3D stereoscopic image is displayed on a whole region of a touchscreen 151. A user is then able to select an icon 1330 from a plurality of icons included in the first layer 1310 through a touch input.

Referring to FIG. 13B, while the user's touch to the selected icon 1330 is being maintained, if the user inclines a mobile terminal 100, the controller 180 controls layers to rotate at a prescribed speed centering on a central axis by fixing the selected icon 1330 to the touchscreen while the inclination of the mobile terminal is detected via the sensing unit 140.

In doing so, the controller 180 is able to control a degree of the rotation according to the corresponding inclination. This fact is similar to the former description with reference to FIGS. 12A-C and its redundant description is omitted from the following description for clarity.

While the inclination of the mobile terminal keeps being detected via the sensing unit 140, a 3D stereoscopic image rotates centered on the central axis so that each of the layers can be displayed on the touchscreen 151. In this case, the icon 1330 still touched by the user keeps being displayed by staying at the selected touch point.

Referring to FIG. 13C, if a specific second layer 1320 is displayed on the touchscreen 151, the user is able to manipulate the mobile terminal 100 to have no inclination with reference to the central axis. If the inclination is not further detected via the sensing unit, the rotation of the 3D stereoscopic image stops. If the touch is released from the selected icon, the selected icon 1330 is arranged in a prescribed region of the second layer.

In doing so, the selected icon 1330 is automatically arranged in a vacant space of the second layer or can be arranged at the touch release point by pushing away another icon.

Therefore, the user is facilitated to change the position of the selected icon 1330 to the second layer 1320 from the first layer 1310.

In this case, the selected icon can be arranged in the prescribed region of the second layer in a manner of scrolling or flicking the touchscreen 151 while the icon is selected.

Meanwhile, it is able to give a prescribed second visual effect to indicate that the icon has been selected from a plurality of the icons included in the first layer by the user.

Figure 14A:
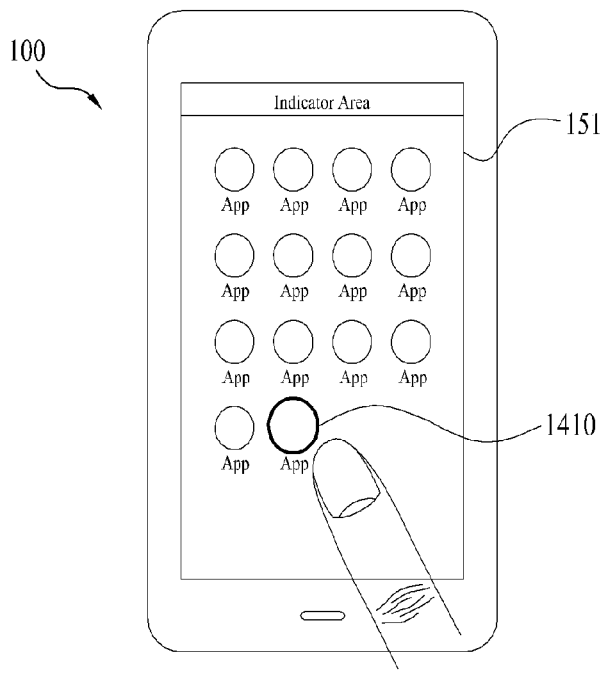
FIGS. 14A and 14B are diagrams for one example of displaying a visual effect of an icon selected from a 3D user interface implemented in a mobile terminal according to another embodiment of the present invention.
Figure 14B:
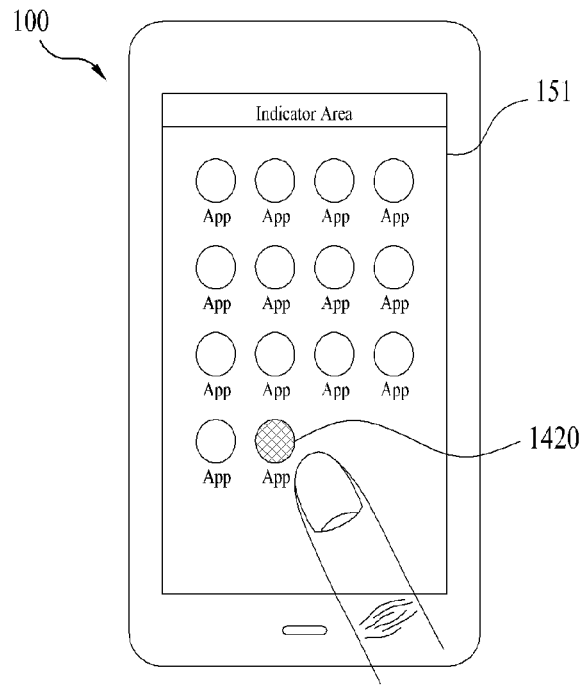

FIGS. 14A and 14B are diagrams for one example of displaying a visual effect of an icon selected from a 3D user interface implemented in a mobile terminal 100 according to another embodiment of the present invention.

Referring to FIG. 14A, since a size of an icon 1410 selected by a user increase bigger than those of the rest of icons, it may be intuitively recognized that the corresponding icon has been selected by the user.

Referring to FIG. 14B, since a selected icon 1420 has a color different from that of a general icon, it may be confirmed that the selected icon 1420 has been selected by a user.

Besides, the second visual effect of the present invention is able to explicitly inform a user that an icon has been selected via at least one of various effects including a color, a surface texture pattern, a flickering, a size variation, a shape change of at least one portion and the like of the selected icon. Therefore, the user is further facilitated to use the mobile terminal 100.

Third Embodiment

A mobile terminal 100 according to another embodiment of the present invention is able to provide a stereoscopic user interface. In particular, the mobile terminal 100 displays a prescribed touch region on a prescribed region of a touchscreen. While the corresponding touch region is being touched with a pointer, a stereoscopic layer object rotates at a prescribed speed centered on a central axis to change positions of a plurality of layers, respectively. Thus, the 3D user interface enables the position-changed layers to be displayed on the touchscreen 151.

Namely, in order to rotate a stereoscopic layer object, a touch input is used instead of the former control using the inclination. This is explained with reference to FIGS. 15A-C as follows.

Figure 15A:
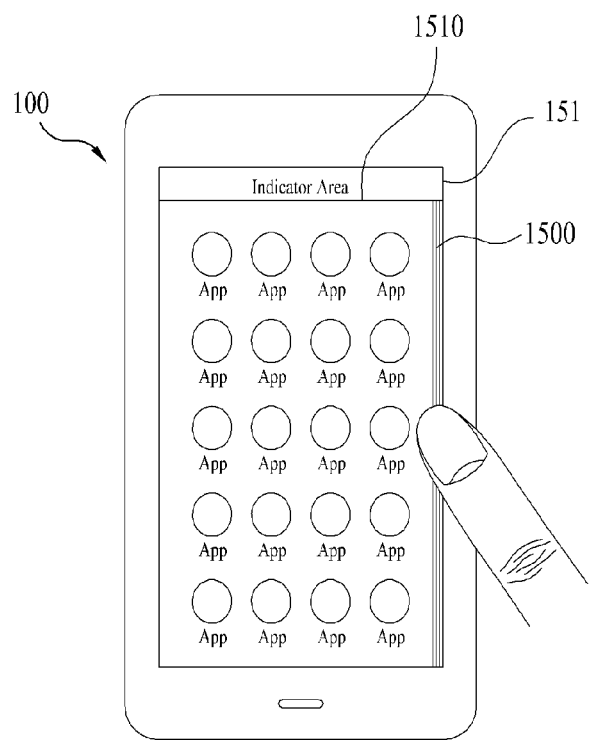
FIGS. 15A-C are diagrams for one example of a method of manipulating a 3D layer through a touch region in a 3D user interface implemented in a mobile terminal according to another embodiment of the present invention.
Figure 15B:
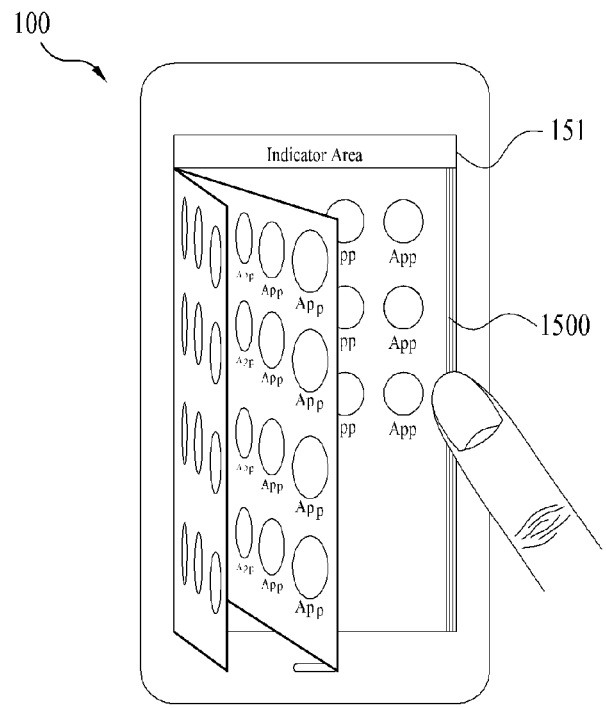
Figure 15C:
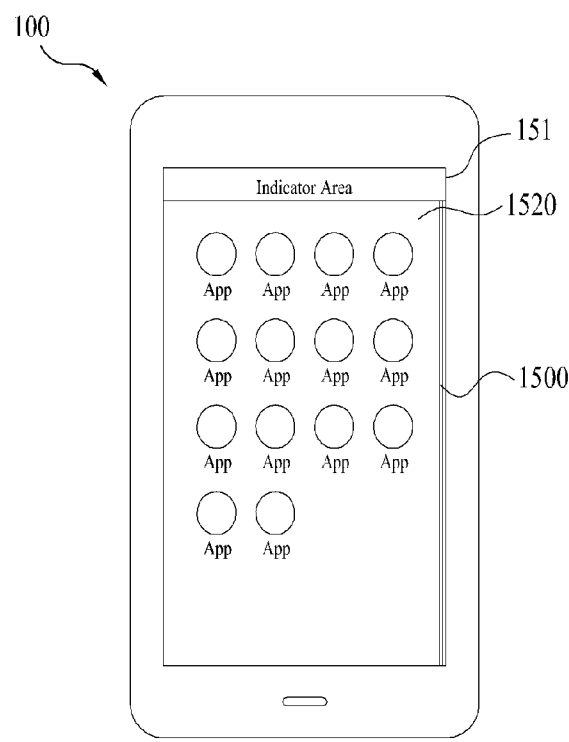

FIGS. 15A-C are diagrams for one example of a method of manipulating a 3D layer through a touch region in a 3D user interface implemented in a mobile terminal 100 according to another embodiment of the present invention.

The basic assumption in FIGS. 15A-C is similar to that in FIGS. 12A-C. For clarity, the redundant description shall be omitted from the following description.

Referring to FIG. 15A, a first layer 1510 in a 3D stereoscopic image is displayed on a whole region of a touchscreen 151. And, a touch region 1500 for rotating the 3D stereoscopic image is displayed on a right side of the touchscreen 151 by having a prescribed visual effect given thereto. Yet, the shape and position of the touch region 1500 shown in FIGS. 15A-C is just exemplary, by which the present invention is non-limited. Alternatively, the touch region 1500 can be configured with various shapes and positions.

If a user touches the touch region 1500 with a pointer (e.g., finger), referring to FIG. 15B, while the touch region 1500 keeps being touched with the pointer, the controller 180 controls the 3D stereoscopic image to be displayed on the touchscreen 151 by rotating at a prescribed speed centered on a central axis in a manner that at least one of a position and a 3D depth of each of a plurality of layers is changed.

Subsequently, referring to FIG. 15C, if a specific second layer 1520 is displayed on the touchscreen 151, the user is able to release the touch input. If the touch input is released, the 3D stereoscopic image stops rotating and a second layer 1520 is displayed on the touchscreen 151.

In the above description, the 3D stereoscopic image is assumed as rotating to the left, which is just exemplary. Alternatively, the positions of the 3D layers can be respectively changed as the 3D stereoscopic image rotates to the right according to a user's random setting (e.g., the touch region 1500 arranged at the right side).

In case of the aforesaid first visual effect (cf. FIG. 14A), the function of the touch region 1500 as well as the original function of informing the user that the layers have been generated as the 3D stereoscopic image is provided. Yet, in case that both of the first visual effect and the touch region 1500 are displayed on the touchscreen 151 together, the function of the first visual effect will be limited to the original function of informing the user that the layers have been generated as the 3D stereoscopic image.

Moreover, since the shape and position of the touch region 1500 for rotating the 3D stereoscopic image are non-limited, such a touch region as shown in FIG. 16 can be displayed on the touchscreen 151.

Figure 16A:
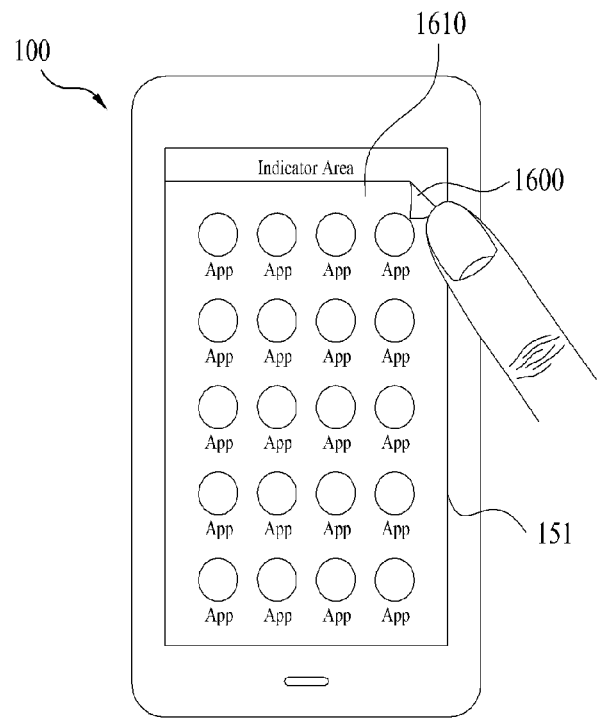
FIGS. 16A-C are diagrams for one example of a method of manipulating a 3D layer though a touch region of another type according to another embodiment of the present invention.
Figure 16B:
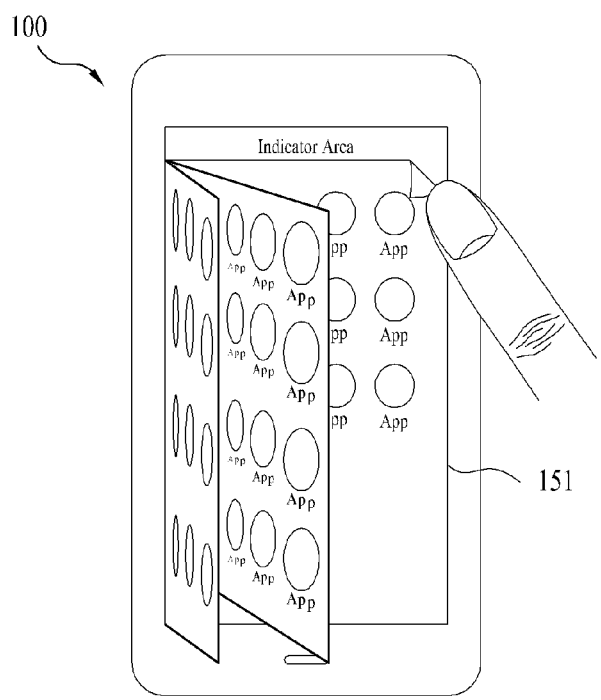
Figure 16C:
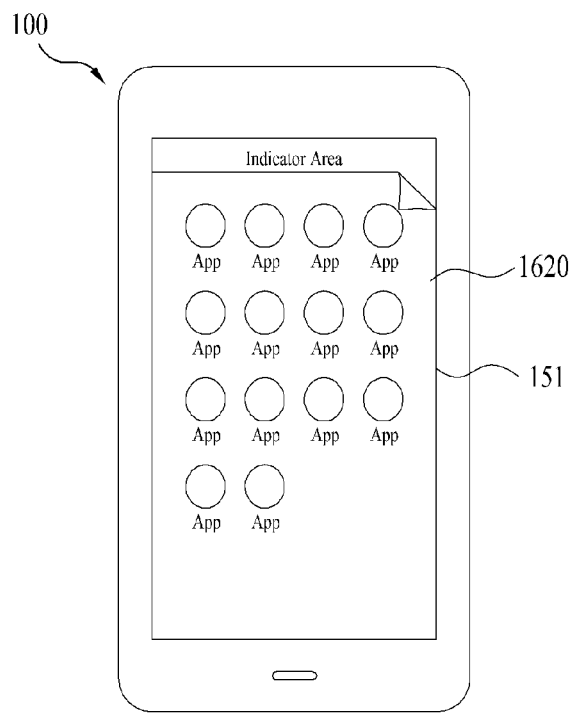

FIGS. 16A-C are diagrams for one example of a method of manipulating a 3D layer though a touch region of another type according to another embodiment of the present invention.

Referring to FIG. 16A, a touch region can be provided to a partial region of a right top side of a touchscreen 151 by being implemented as a page turning shape 1600. Since a process for rotating a 3D stereoscopic image is similar to the former process described with reference to FIGS. 15A-C, for clarity, the redundant description shall be omitted from the following description.

Meanwhile, a position of an icon included in a first layer among 3D layers may be changed using the touch region 1600.

FIG. 17 is a diagram for one example of a method of changing a position of an icon included in a 3D layer through a touch region in a mobile terminal according to a further embodiment of the present invention.

In the following description, assume that a 3D stereoscopic image rotates to the left, which is just exemplary. On the contrary, the 3D stereoscopic image can rotate to the right to implement the present invention.

Figure 17A:
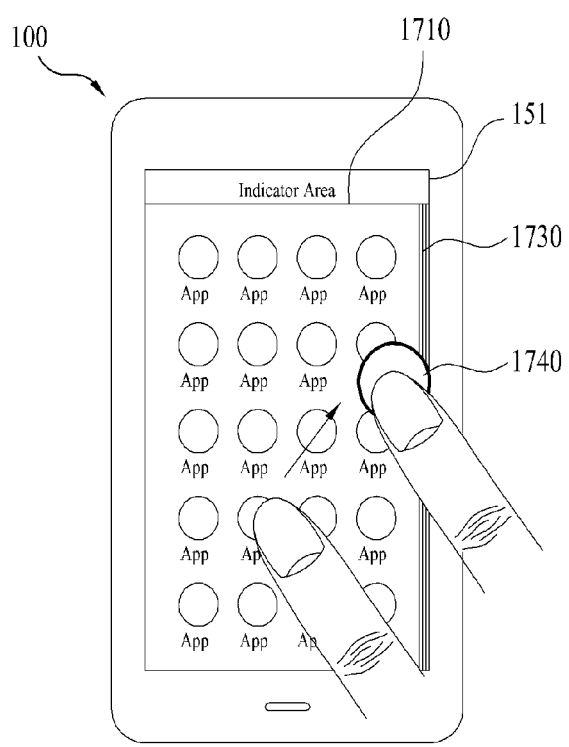
FIGS. 17A-C are diagrams for one example of a method of changing a position of an icon included in a 3D layer through a touch region in a mobile terminal according to a further embodiment of the present invention.

Referring to FIG. 17A, a first layer 1710 in a 3D stereoscopic image is displayed on a whole region of a touchscreen 151. A user selects one of a plurality of icons included in the first layer 1710 and is then able to drag and shift the selected icon 1740 to a touch region 1730.

Figure 17B:
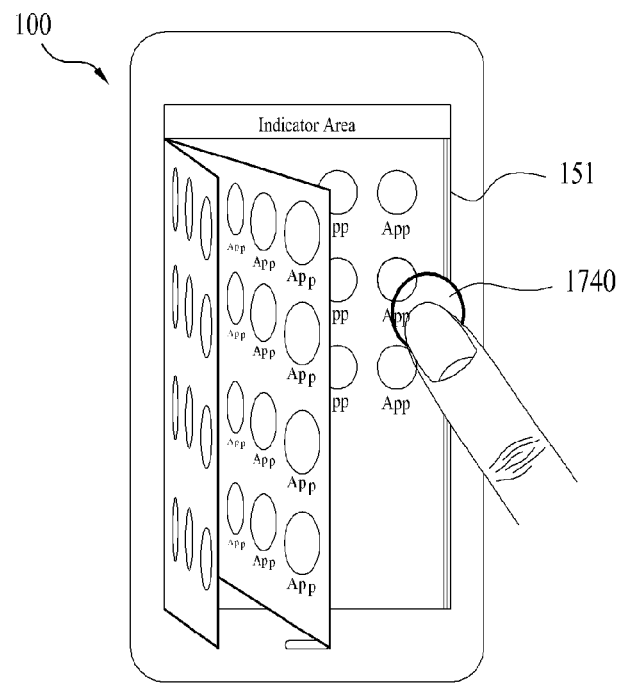

Referring to FIG. 17B, if the touch to the dragged icon 1740 keeps being maintained, the controller 180 controls the 3D stereoscopic image to be displayed on the touchscreen 151 in a manner that at least one of a position and a 3D depth of each of a plurality of 3D layers is changed in the 3D stereoscopic image, which is rotating at a prescribed speed centered on a central axis while the dragged icon 1740 is displayed on the touchscreen.

Figure 17C:
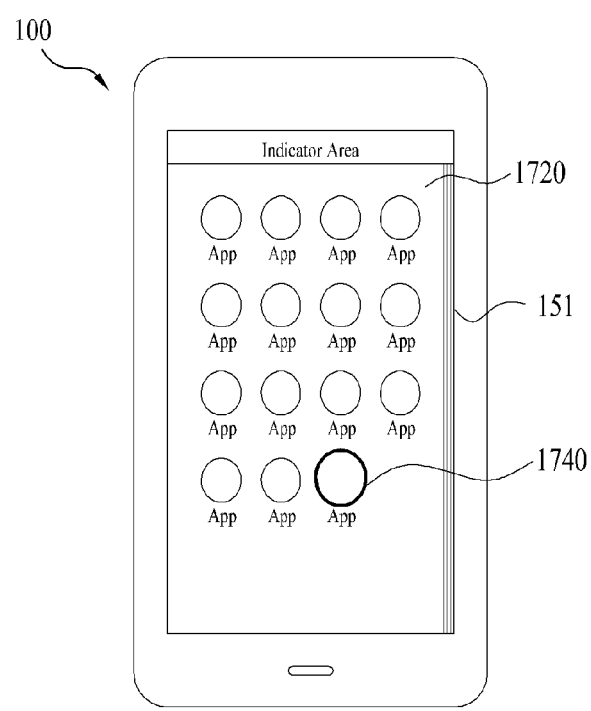

Subsequently, referring to FIG. 17C, if a specific second layer 1720 is displayed on the touchscreen, the user is able to release the touch from the selected icon 1740. If the touch is released, the rotation of the 3D stereoscopic image stops and the second layer having the selected icon 1740 arranged in a prescribed region is displayed on the touchscreen 151.

Moreover, in order to indicate that the user has selected the icon 1740 from a plurality of the icons included in the first layer 1710, a second visual effect can be given to the selected icon. For instance, a size the selected icon is 1740 increased such that it is bigger than the size of the rest of the icons by the second visual effect. For another instance, the selected icon has a color different from those of the rest of the icons 1740 according to the second visual effect.

The second visual effect of the present invention is able to explicitly inform a user that an icon has been selected via at least one of various effects including a color, a surface texture pattern, a flickering, a size variation, a shape change of at least one portion and the like of the selected icon 1740.

The above mentioned embodiments are described in a manner that the arranged formation of layers is changed in order of an upper arranged layer to a lower arranged layer, by which the present invention is non-limited. Alternatively, it is apparent to those skilled in the art that the arranged formation can be changed in opposite order.

It will be apparent to those skilled in the art that various modifications and variations can be specified into other form(s) without departing from the spirit or scope of the inventions.

Meanwhile, according to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The above described configurations and methods of the embodiments are not limitedly applicable to the mobile terminal 100 including the display 151 configured to display the above described stereoscopic image. To enable various modifications, the embodiments can be selectively combined together entirely or in part.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
  a touchscreen configured to display a 3-Dimensional (3D) user interface including at least one portion of a stereoscopic structure, the 3D user interface comprising a plurality of layers arranged and centered about a central axis such that the plurality of layers are spaced apart from each other by a prescribed gap, each of the plurality of layers including at least one icon;
  a sensing unit configured to detect an inclination of the mobile terminal relative to a plane; and
  a controller configured to:
  control the touchscreen to display different 3D depths for at least one of the plurality of layers of the 3D user interface in order to provide a 3D stereoscopic image in response to detecting a first input;
  control the touchscreen to change a position of at least one of the plurality of layers of the 3D user interface in response to detecting a second input, the position changed by rotation centered about the central axis;
  control the touchscreen to display a first layer of the plurality of the layers of the 3D user interface on an entire region of the touchscreen;
  select at least one icon among the at least one icon of the first layer displayed on the entire region of the touch screen in response to a touch input received at a touch position on the touchscreen;
  control the touchscreen to change a position of each of the plurality of layers of the 3D user interface by rotation centered about the central axis when the inclination of the mobile terminal is detected by the sensing unit, wherein the inclination of the mobile terminal is detected while the received touch input is maintained at the touch position;

control the touchscreen to display the selected at least one icon at the touch position while the touch input is maintained at the touch position and the position of each of the plurality of layers is changed in response to the detection of the inclination of the mobile terminal;

control the touchscreen to display a second layer of the plurality of layers on the entire region of the touchscreen when the mobile terminal enters a parallel state;

detect a release of the touch input from the touch position on the touchscreen while the second layer is displayed on the entire region of the touchscreen and the mobile terminal is in the parallel state; and control the touchscreen to display the selected at least one icon previously displayed at a first position of the first layer at a second position of the second layer in response to the detection of the release of the touch input.

2. The mobile terminal of claim 1, wherein the touchscreen includes a parallax generating means configured to provide the 3D stereoscopic image by changing at least a propagation direction or a vibration direction of light.

3. The mobile terminal of claim 1, wherein the controller is further configured to control the touchscreen to change a direction and a speed of the rotation to correspond to the detected inclination.

4. The mobile terminal of claim 1, wherein the controller is further configured to control the touchscreen to provide a visual effect to the selected at least one icon.

5. The mobile terminal of claim 1, wherein the controller is further configured to:
control the touchscreen to display a touch region on a prescribed region of the touchscreen for rotating the at least one portion of the stereoscopic structure;
detect a touch of the touch region of the touchscreen; and
control the touchscreen to change a position of each of the plurality of layers of the 3D user interface by rotation centered about the central axis while the touch of the touch region is maintained.

6. The mobile terminal of claim 1, wherein the controller is further configured to control the touchscreen to provide a visual effect to indicate that the 3D stereoscopic image is provided on a prescribed region of the touchscreen.

7. The mobile terminal of claim 1, wherein the first input is a touch input of a first pattern received via the touch screen.

8. The mobile terminal of claim 1, wherein the second input is a touch input of a second pattern received via the touchscreen.

9. A method of controlling a mobile terminal, the method comprising:
displaying a 3-Dimensional (3D) user interface including at least one portion of a stereoscopic structure on a touchscreen, the 3D user interface comprising a plurality of layers arranged and centered about a central axis such that the plurality of layers are spaced apart from each other by a prescribed gap, each of the plurality of layers including at least one icon;

displaying different 3D depths for at least one of the plurality of layers of the 3D user interface in order to provide a 3D stereoscopic image on the touchscreen in response to detecting a first input;

changing a position of at least one of the plurality of layers of the 3D user interface in response to detecting a second input, the position changed by rotation centered about the central axis;

displaying a first layer of the plurality of the layers of the 3D user interface on an entire region of the touchscreen;

selecting at least one icon among the at least one icon of the first layer displayed on the entire region of the touch screen in response to a touch input received at a touch position on the touchscreen;

changing a position of each of the plurality of layers of the 3D user interface by rotation centered about the central axis when an inclination of the mobile terminal relative to a plane is detected by a sensing unit of the mobile terminal, wherein the inclination of the mobile terminal is detected while the received touch input is maintained at the touch position;

displaying the selected at least one icon at the touch position while the touch input is maintained at the touch position and the position of each of the plurality of layers is changed in response to the detection of the inclination of the mobile terminal;

displaying a second layer of the plurality of layers on the entire region of the touchscreen when the mobile terminal enters a parallel state such that the mobile terminal is not inclined relative to the plane;

detecting a release of the touch input from the touch position on the touchscreen while the second layer is displayed on the entire region of the touchscreen and the mobile terminal is in the parallel state; and displaying the selected at least one icon previously displayed at a first position of the first layer at a second position of the second layer in response to the detection of the release of the touch input.

10. The method of claim 9, further comprising changing a direction and a speed of the rotation to correspond to the detected inclination.

11. The method of claim 9, further comprising providing a visual effect to the selected at least one icon on the touchscreen.

12. The method of claim 9, further comprising displaying a visual effect to indicate that the 3D stereoscopic image is provided on a prescribed region of the touchscreen.

13. The method of claim 9, wherein the first input is a touch input of a first pattern received via the touchscreen.

14. The method of claim 9, wherein the second input is a touch input of a second pattern received via the touchscreen.

* * * * *